United States Patent [19]

Tsuruta

[11] 3,895,101

[45] July 15, 1975

[54] METHOD FOR THE TREATMENT OF WASTE GAS FROM CLAUS PROCESS

[75] Inventor: Hidemasa Tsuruta, Tokyo, Japan

[73] Assignee: Nittetu Chemical Engineering Ltd., Tokyo, Japan

[22] Filed: June 7, 1974

[21] Appl. No.: 477,511

[52] U.S. Cl. .................... 423/574; 55/73; 423/512; 423/539
[51] Int. Cl.² ........................................ C01B 17/60
[58] Field of Search ........... 423/242, 512, 539, 570, 423/574, 576; 55/73

[56] References Cited
UNITED STATES PATENTS

| | | | |
|---|---|---|---|
| 2,082,006 | 6/1937 | Johnstone ........................... | 423/539 |
| 3,615,219 | 10/1971 | Budininkas et al. ................. | 423/570 |
| 3,764,665 | 10/1973 | Groenendaal et al. .............. | 423/574 |

FOREIGN PATENTS OR APPLICATIONS 1,151,398  5/1969  United Kingdom

Primary Examiner—G. O. Peters

[57] ABSTRACT

The sulfur component of the waste gas (which is called tail gas) which issues from the Claus process is effectively recovered and prevented from being released into the atmosphere by a method which comprises oxidizing by combustion the waste gas (hereinafter referred to as "tail gas") for thereby converting the whole sulfur component into $SO_2$, thereafter mixing the resulting gas with a reducing combustion gas for thereby lowering the residual oxygen content of said tail gas to substantial absence, subsequently cooling the resulting gas containing substantially no oxygen and then introducing the cooled gas into a liquid capable of absorbing $SO_2$, heating the resulting $SO_2$-absorbed liquid and recovering the $SO_2$ consequently liberated from the liquid, and circulating the recovered $SO_2$ to the Claus process.

5 Claims, 1 Drawing Figure

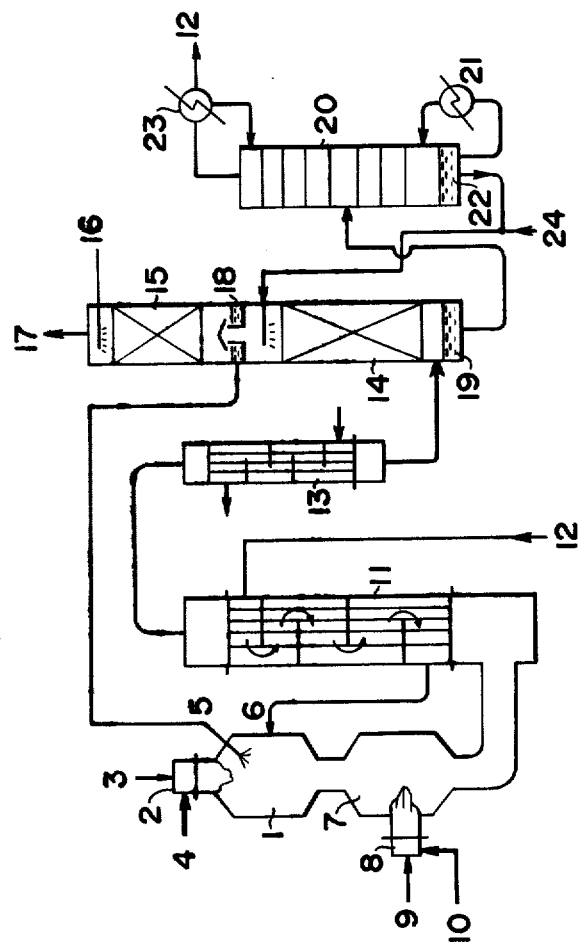

METHOD FOR THE TREATMENT OF WASTE GAS FROM CLAUS PROCESS

BACKGROUND OF THE INVENTION

This invention relates to a method for effective recovery of the sulfur component of the tail gas issuing from the Claus process without allowing it to be released into the atmosphere, more particularly to a method for converting the whole sulfur component of said tail gas into $SO_2$, subsequently recovering the $SO_2$ thus produced and circulating the recovered $SO_2$ to the Claus process to be used therein as a reactant.

In recent years, the necessity for producing low-sulfur distillates of petroleum by stripping the crude petroleum of its sulfur content in the course of refining operation has come to meet with increasing public appreciation in view of the prevention of environmental pollutions. The desulfurization by hydrogenation is a typical means available and has been being utilized for desulfurizing petroleum distillates obtained as kerosene, light oil and heavy oil. The conventional method of desulfurization by hydrogenation causes petroleum distillates to be reduced catalytically with hydrogen at elevated temperatures. According to this method, the sulfur components of the aforementioned petroleum distillates are converted mainly to hydrogen sulfide, which is discharged from the reactor and separated generally by means of an amine-based absorbent.

In the meantime, what is called the gasifying method for desulfurication is now under development which comprises subjecting the crude petroleum to thoroughgoing distillation for thereby collecting in the kettle residue a considerable amount of sulfur in conjunction with ashes, gasifying said kettle residue by pyrolysis or partial combustion within a reducing atmosphere for thereby causing the sulfur component thereof to be converted mainly into hydrogen sulfide and selectively extracting the formed hydrogen sulfide.

When the crude petroleum is desulfurized by these conventional methods, the sulfur component thereof is invariably converted into hydrogen sulfide. In its unaltered form, the hydrogen sulfide thus extracted fails to find any extensive utilization in commercial operations and does not permit easy storage and transportation. It is, therefore, customary for the aforementioned hydrogen sulfide to be subjected to the so-called Claus process based on the reactions of the following formulas (1), (2) and (3), so that it may be recovered in the form of the simple substance of sulfur.

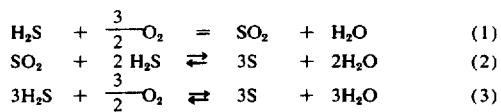

According to the Claus proces, a part of $H_2S$ is oxidized into $SO_2$ as indicated by the formula (1) and the produced $SO_2$ is caused to react with the remaining $H_2S$ and undergo conversion into sulfur as the simple substance and water as indicated by the formula (2). The reaction mechanism just described is expressed by the formula (3) which combines the formulas (1) and (2), and, thus, may as well be considered as representing the partial oxidation of $H_2S$. This reaction is generally carried out by using air in the presence of an alumina-based catalyst at normal atmospheric pressure in the neighborhood of 300°C. In the Claus process, there occur chemical equilibria as indicated by the formulas (2) and (3) described above. Because of the equilibrium of the gas phase in the reaction system of the formula (2), the reaction stops midway as the partial vapor pressures of the product components $H_2O$ and S. By this reason, also in the actual performance of the Claus process, there is followed a practice of having the catalyst bed divided into two to four layers and, at each section the reaction is brought to a stop, cooling the gas in the intermediary zone of the catalyst bed for thereby condensing and separating the sulfur component and consequently lowering the partial pressure in an effort to bring the reaction of the formula (3) to completion. In the Claus process which is effected by use of an equipment of a commercial scale, it is said that the ratio of recovery of $H_2S$ in the form of S or the conversion of $H_2S$ to S generally increases from 92 to 95 percent in proportion as the number of the layers into which the catalyst bed is divided increases from two to four. Even so, 5 to 8 percent of the sulfur component escapes being uncaptured in the Claus reaction system. If the uncaptured sulfur component is suffered to be released into the atmosphere, it can form a cause for serious environmental pollutions.

Further, in the tail gas which issues from the Claus process, the sulfur component remains in the form of $H_2S$ and $SO_2$ respectively in amounts to give an approximate molar ratio of 2.0 as suggested by the left member of the equation (2). In addition, there exist $CS_2$, COS, etc. which have resulted from various changes of the sulfur component. Moreover, the elementary S in the resultant system partly escapes condensation and remains in the gaseous form and at the same time the condensed portion of this S component partly remains suspended in the form of mist within the gas. The tail gas, thus, has a fairly complicated composition. Of course, $N_2$ as a component of the air used for combustion and $H_2O$ as a reaction product are also existent therein in large amounts.

As the recognition of necessity of treating such tail gas so as to ensure thorough removal of the sulfur component therefrom has gain momentum in recent years, several processes have been developed and suggested. However, these processes invariably prove hardly perfect in terms of construction cost, operation cost, secondary environmental pollutions, etc.

SUMMARY OF THE INVENTION

The present invention aims to treat the tail gas produced by the Claus process so as to oxidize the whole sulfur component of the gas into $SO_2$ of a high concentration, separate and recover the formed $SO_2$, return the recovered $SO_2$ to the Claus reaction equipment, add it to the reaction system of the Claus process and convert it into sulfur as simple substance by the reaction of the formula (2) or (3).

It is, therefore, an object of this invention to provide a method for the treatment of the tail gas produced by the Claus process, whereby the sulfur component of the aforementioned tail gas is effectively recovered in the form of sulfur as simple substance without allowing the sulfur component to be released into the atmosphere. Other objects of the present invention will become apparent from the following description of the invention.

BRIEF EXPLANATION OF THE DRAWING

The drawing attached hereto is a process diagram illustrating an operation required for effecting the method of this invention.

DETAILED DESCRIPTION OF THE INVENTION

The construction of the present invention will be described herein below with reference to the accompanying drawing. In the drawing, (1) denotes an oxidation furnace adapted to cause oxidative combustion of the sulfur-containing tail gas issuing from the Claus reaction equipment. To this furnace, the tail gas which has been discharged through the line 12 from the Claus reaction equipment (which generally contains 0.4 to 1.0 percent of $H_2S$, 0.2 to 0.5 percent of $SO_2$, and small quantitites of COS, $CS_2$ and S vapor), and then preheated to about 400° to 600°C by passage through the heat-exchanger 11 is blown in via the tail gas inlet nozzle 6. Where necessary, the ammonium sulfate solution recovered within the ammonia absorption column 15 to be described herein below is sprayed into the furnace by means of the ammonium sulfate solution nozzle 5 which is also incorporated. This furnace is provided at one end thereof with the auxiliary fuel burner 2 which serves the purpose of elevating the temperature of the furnace interior to a required oxidation temperature. This fuel burner is supplied with auxiliary fuel 3 and combustion air 4. The tail gas inlet nozzle 6 and the ammonium sulfate solution nozzle 5 are generally provided each with a means for introducing an amount of air required for the purpose of the oxidation involved, although the drawing does not indicate such means.

Within the furnace, therefore, the flame from the auxiliary fuel burner serves as the source of fire and, owing to the heat from this flame, the tail gas is further elevated to a higher temperature and at the same time the tail gas itself undergoes air oxidation for the whole sulfur component thereof to be converted into $SO_2$. In the case of an operation in which the ammonium sulfate solution is introduced into the aforementioned oxidation furnace, because of this heat, the liquid component of ammonium sulfate solution is evaporated and, on the other hand, the solid component thereof is elevated in temperature and subsequently caused to undergo thermal decomposition and oxidation, with the result that the sulfate radical of ammonium sulfate is dissociated at the elevated temperature as indicated by the equation: $SO_3 \rightarrow SO_2 + O_2$. In this case, part of the ammonia radical remains in its unaltered form within the gas and the remaining portion thereof is decomposed by oxidation into $N_2$ and $H_2O$.

As described above, an endothermic reaction and an exothermic reaction take place simultaneously within the furnace and the loss of heat through the furnace proper is also involved. The amount of the auxiliary fuel to be used is determined so that the overall temperature of the furnace reflecting all these thermal factors is brought to a predetermined level.

Where the use of the ammonium sulfate solution is involved as described above, the temperature of the combustion of the mixed gas within the oxidation furnace is to be determined by taking into due consideration for complete combustion of the sulfur component and the conversion of thermal decomposition of ammonia gas produced from ammonium sulfate. No general rule applies in this case because such factors are governed by the air ratio within the furnace, average retention time of gas, agitation of gas within the furnace interior, etc. In the case of a furnace wherein the gas is amply agitated, for example, substantially perfect combustion of sulfur can be accomplished under suitable conditions including 0.1 to 5.0 sec. of average retention tiem and air ratio of not more than 1.50, preferably not more than 1.15 of air ratio and not less than 600 °C of gas temperature. In order for the ammonium sulfate to be thermally decomposed and for the sulfate radical to be converted substantially to $SO_2$, temperatures over 700°C are practicatly sufficient. It has been found, however, that at such temperatures, a considerable portion of the ammonia fraction continues to remain unoxidized within the gas.

As explained above, it has been made clear that even under conditions of a relatively low temperature and a slight excess of air ratio, the sulfur component of the tail gas can be substantially completely converted into $SO_2$. In the light of the rule of chemical equilibrium constant, the possibility that the reaction of the following formula (4) indicating the oxidation of $SO_2$ by remaining $O_2$ into $SO_3$ is appreciably inclined toward the right member of the equation is hardly conceivable under the aforementioned conditions of air ratio and temperature.

$$SO_2 + O_2 \rightleftarrows SO_3 \tag{4}$$

The reason is that this equilibrium is notably inclined toward the left member of the equation in accordance as the temperature rises. Thus, the oxygen concentration in the atmosphere of the furnace interior should be maintained as low as permissible. This is necessary not only for the purpose of precluding formation of $SO_3$ but also for decreasing the cost of rendering, in the subsequent steps of operation, said atmosphere neutral or weakly reductive The gas which has undergone the combustion under the conditions described above is delivered in situ to the reducing furnace 7. Within the furnace 7, a partially burnt gas containing, as reducing components, CO and $H_2$ is blown in from the reductive combustion burner 8 and the two gases are homogeneously mixed. Generally to the reductive combustion burner 8, a petroleum fuel 9 and combustion air 10 are supplied at an air ratio of 0.6 to 0.7 to produce a high-temperature gas containing the reducing components described above. In the interior of the reducing furnace 7, these two currents of gases are mixed so that the remaining $O_2$ substantially ceases to exist eventually in consequence of reaction with CO and $H_2$. For this purpose, the final atmosphere within the reducing furnace is only required to be neutral or slightly reductive. In the subsequent steps of cooling and absorbing of gas, the reaction of the formula 4 tends to proceed in the direction of the right member of equation consequently cause part of $SO_2$ to be partially converted to $SO_3$ as suggested by the rule of equilibrium constant. The atmosphere of the nature described above is, therefore, necessary for preventing the reaction from occurring in such direction.

The gas which has emanated from the reducing furnace is passed through the heat-exchanger 11, wherein it exchanges heat, as described previously, with the tail gas and consequently cools itself and, because of subsequent passage through the gas cooler 13, falls to or below about 100°C. The cooled gas is then sent to the bottom 19 of the $SO_2$ absorption column 14. Within this column, the absorption of $SO_2$ proceeds from the left member to the right of the formula 5.

$$(NH_4)_2SO_3 + SO_2 + H_2O \rightleftarrows 2(NH_4)HSO_3 \quad (5)$$

As the gas is ascending through the interior of the column, it is brought into contact with the aqueous solution mainly containing $(NH_4)_2SO_3$ which is simultaneously descending from the column top through the column interior, with the result that a liquid predominantly containing $(NH_4)HSO_3$ is discharged through the bottom of the column. The concentration of $SO_2$ which escapes into the gas discharged through the column top varies to a great extent with the concentration of salt and the concentration ratio of $SO_3^{--}$ and $NH_4^+$ in the absorption liquid supplied to the column top and the temperature condition in addition to the contact efficiency of the column. Generally speaking, to lower the outlet $SO_2$ concentration, it is necessary that the equilibrium partial pressure of $SO_2$ which the liquid under discussion exhibits should be kept at least below the partial pressure of $SO_2$ present in the gas. To satisfy this requirement, it is necessary that the liquid to be supplied to the column top should possess a composition wherein the ratio of $(NH_4)/(SO_3)$ approaches 2 as indicated by the formula (5). This condition, on the other hand, entails an increase in the equilibrium partial pressure of ammonia. Accordingly, a decrease in the tolerable $SO_2$ residue in the discharged gas results in an increased concentration of ammonia to be liberated. An attempt to lower the concentration of $SO_2$ in the discharge gas to below 200 ppm at 50°C of the absorption liquid temperature, for example, causes the ammonia concentration in the gas to rise over 20,000 ppm. Therefore, it is undesirable for the gas of such high ammonia content to be released as it is into the atmosphere. In such a case, therefore, it becomes necessary for the waste gas as from the $SO_2$ absorption column to be led into an ammonia absorption column 15 which is disposed in connection with said absorption column and therein allowed to ascend through the column interior so as to come into contact with the sulfuric acid simultaneously descending through the column interior, with the result that the ammonia component is fixed in the form of ammonium sulfate and discharged through the bottom 18 of the ammonia absorption column. In the drawing, 17 denotes a gas discharge orifice provided at the top of the ammonia absorption column 15. The ammonium sulfate liquid thus produced is returned back to the oxidation furnace as illustrated in the drawing to undergo thermal decomposition.

Before the gas is finally released from the system into the atmosphere, the $SO_2$ concentration in the gas is lowered to below a fixed level in the manner described above. As the temperature of the gas containing $SO_2$ falls, or said gas is brought into contact with the liquid at a low temperature as described above, the equilibrium in the formula 4 tends to proceed remarkably in the direction of the right member of the equation where the prevalent temperature is not more than 300°C. In the case of this invention, however, since the atmosphere of gas emanating from the reducing furnace is neutral or weakly reductive and the remaining $O_2$ is substantially absent, there is no possibility of any oxidation taking place in the course of the operation described above. From this, it follows that the absorption liquid which is withdrawn through the bottom 19 of the $SO_2$ absorption column mainly contains acidic ammonium sulfite and contains practically no sulfate radical.

The absorption liquid is delivered, while retaining the fixed amount of $SO_2$, to the middle stage of the $SO_2$ stripping column 20. This stripping column is provided at the bottom thereof with a reboiler 21 and at the top thereof with a partial condenser 23. In the partial condenser, a fair amount of the ascending steam is condensed and refluxed to the column top and, at the same time, the remaining steam is returned, together with $SO_2$, via the partial condenser 23 to the inlet side of the Claus reaction equipment (not shown). While the water condensed within the partial condenser is falling down, the ammonia which is generated at the column bottom is again absorbed by the descending water and consequently returned to the column bottom and finally discharged out of the bottom 22 of the $SO_2$ stripping column in the form of a solution containing $(NH_4)_2SO_3$ as the principal component. If necessary for the preservation of ammonia balance in the entire system, the solution is combined with replenishing ammonia supplied from 24 and thereafter returned to the top of the $SO_2$ absorption column 14.

Thus, the gas which is delivered to the $SO_2$ absorption column by the method of the present invention contains practically no residual $O_2$. Besides, the absorption liquid in the course of circulation has particularly no a chance to expose itself to the atmosphere and absorb $O_2$ into a dissolved state, there is absolutely no possibility that the sulfite in the liquid phase will be oxidized into sulfate. This fact proves highly advantageous from the operational point of view, because any sulfate is consequently prevented from being accumulated in the absorption liquid in circulation.

The construction of this invention has been described with reference to the accompanying drawing. The steps of first subjecting the tail gas issuing from the Claus process to complete combustion within the oxidation furnace in the presence of as small an excess air as permissible for thereby converting the whole sulfur component thereof into $SO_2$ and subsequently delivering the treated tail gas into the reducing furnace and having the resulting atmosphere within the furnace rendered neutral or weakly reductive by addition of $H_2$ and CO at an elevated temperature and finally cooling the gases constitute one of the characteristic features of this invention. The description given above has presumed a case wherein the partially burnt gas of a fluid fuel is used as the reducing gas. Where some other suitable gas containing $H_2$ and CO is available, it can be delivered directly into the reducing furnace. Also, the present invention is characterized by the steps of treating in the absorption and stripping units the gas which has been cooled as described above and which contains no residual $O_2$, again recovering $SO_2$ at a high concentration while preventing the absorbed salt from being oxidized into sulfate and returning the recovered $SO_2$ back to the Claus reaction equipment as part of the raw materials. In the description of this invention given above, the $SO_2$ absorption-stripping cycle has been explained by citing the known process which utilizes the cycle based on the reaction mechanism represented by the formula 5. It should be understood that, as other embodiments of this cycle, the known methods resorting to the reversible conversion of $Na_2SO_3 \rightleftarrows NaHSO_3$ and to the use of the aqueous solution of an organic amine are also embraced by the present invention.

Now, one illustrative example of this invention will be cited herein below. EXAMPLE:

A tail gas from Claus process which had the following composition was treated.

| | |
|---|---|
| $H_2S$ | 0.80% (Volume) |
| $SO_2$ | 0.40% (Volume) |
| $COS + CS_2$ | 0.05% (Volume) |
| $H_2O$ | 34.5% (Volume) |
| Sulfur mist and vapor | 8 g/$NM^3$ of gas |
| $N_2$, $CO_2$ | Balance to make up 100% |

By means of a heat-exchanger like the one indicated by 11 in the accompanying drawing, this tail gas was heated from about 150°C to the neighborhood of 600°C. In an oxidation furnace 1, 100 $NM^3$ of the tail gas and about 0.80 to 0.85 kg of No. 6 fuel oil, as auxiliary fuel, were mixed and burnt. It was confirmed that under these conditions, the whole sulfur component was converted to $SO_2$. The amount of residual oxygen following the mixed combustion was maintained near 1.05 as air ratio.

Then, the gas thus treated was lead as it is into a reducing furnace 7, wherein it was mixed with the high-temperature reductive combustion gas obtained by using No. 6 fuel oil, in the reducing burner. Amount of the fuel used for reductive combustion, was 0.1 kg per 100 $NM^3$ of said tail gas. This mixture was burned therein at an air ratio of 0.65 (1.00 being the theoretical value). The entire atmosphere could be rendered weakly reductive by blowing in the gas resulting from this combustion into the reducing furnace. The formed $SO_2$, while its travel through the subsequent heat-exchanger 11, the gas cooler 13 and the $SO_2$ absorption column 14, was observed to undergo absolutely no oxidation.

The absorption and stripping of $SO_2$ were carried out by using a system based on the reaction represented by the formula 5. The absorption liquid was circulated through the $SO_2$ absorption column 14 and the $SO_2$ stripping column 20. Since this circulation was carried out without permitting entry of the ambient air, oxidation of the sulfite radical to sulfate radical was hardly observed to occur therein.

The $SO_2$ and $NH_3$ concentrations in the discharge gas at the outlet of the absorption column 14 were 100 ppm and 150 ppm respectively when the liquid temperature at the top of the absorption column was maintained at 40°C. In this case, depending on prevailing operating conditions, these concentrations were varied to some extent as, for example, to 350 ppm of $NH_3$ vs. 70 ppm of $SO_2$ or to 80 ppm of the former vs. 150 ppm of the latter. This indicates that proper selection of operating condistions will suffice for required concentration adjustment.

Thus, the almost whole sulfur component of the tail gas issued from the Claus process could be recovered in the form of $SO_2$ through the top of the stripping column 20.

What is claimed is:

1. A method for the treatment of the tail gas formed in the Claus process, characterized by oxidizing by combustion the tail gas thereby converting the whole sulfur component thereof into sulfurous acid gas ($SO_2$), thereafter mixing the resulting gas with a reducing combustion gas containing carbon monoxide and hydrogen for thereby lowering the residual oxygen content of said tail gas to substantial absence, subsequently cooling the resulting gas containing substantially no oxygen in a neutral to reductive atmosphere, then introducing the cooled gas into a liquid capable of absorbing $SO_2$ for thereby causing the sulfurous acid gas present in said tail gas to be absorbed in said liquid, heating the sulfurous acid gas-absorbed liquid for thereby causing the liquid to liberate the sulfurous acid gas, then recovering the liberated sulfurous acid gas and circulating the recovered gas to the aforementioned Claus process.

2. The method of claim 1, wherein said tail gas is oxidized by combustion together with an auxiliary fuel under conditions of not more than 1.50 of air ratio and not less than 600°C of temperature.

3. The method of claim 1, wherein said tail gas is oxidized by combustion while in the presence of ammonium sulfate solution.

4. The method of claim 1, wherein said liquid capable of absorbing sulfurous acid gas is an aqueous solution containing ammonium sulfite as the principal active component.

5. The method of claim 4, wherein the liquid containing acidic ammonium sulfite which is obtained by having the aforementioned aqueous solution absorb the sulfurous acid gas is heated to cause liberation of sulfurous acid gas therefrom and the aqueous solution containing ammonium sulfite which is formed in consequence of said liberation is utilized cyclically as the liquid for the absorption of sulfurous acid gas.

* * * * *